United States Patent [19]

Sharp

[11] Patent Number: 4,870,856
[45] Date of Patent: * Oct. 3, 1989

[54] SPLIT FITTINGS USEFUL IN FORMING A SECONDARY SEMI-RIGID PIPELINE OVER PRIMARY PIPELINES

[76] Inventor: Bruce R. Sharp, 4090 Rose Hill, Cincinnati, Ohio 45229

[*] Notice: The portion of the term of this patent subsequent to May 26, 2004 has been disclaimed.

[21] Appl. No.: 198,454

[22] Filed: May 25, 1988

[51] Int. Cl.⁴ .............................................. G01M 3/08
[52] U.S. Cl. .................................. 73/40.5 R; 73/49.1; 285/93; 285/133.1; 285/373; 285/423; 285/906; 285/915
[58] Field of Search ...................... 285/373, 45, 133.1, 285/138, 139, 15, 419, 93, 423, 906, 915; 73/49.1, 40.5 R

[56] References Cited

U.S. PATENT DOCUMENTS

| | | |
|---|---|---|
| 316,967 | 5/1885 | Heber . |
| 412,255 | 10/1889 | Hattery ............................ 285/133.1 |
| 1,136,548 | 4/1915 | Moore . |
| 1,888,241 | 11/1932 | Rah .................................. 285/373 X |
| 2,094,258 | 9/1937 | Thompson ....................... 285/373 X |
| 2,412,394 | 12/1946 | Giles ................................ 285/373 X |
| 2,658,527 | 11/1953 | Kaiser ................................... 138/25 |
| 3,299,417 | 1/1967 | Sibthorpe ............................ 340/242 |
| 3,430,484 | 4/1969 | Wittgenstein ........................ 73/40.5 |
| 3,721,270 | 3/1973 | Wittgenstein ........................ 138/104 |
| 3,861,422 | 1/1975 | Christie ................................. 138/99 |
| 3,944,260 | 3/1976 | Petroczky ............................. 285/15 |
| 4,015,634 | 4/1977 | Christie ................................. 138/99 |
| 4,062,376 | 12/1977 | McGrath ............................. 137/312 |
| 4,172,607 | 10/1979 | Norton ............................ 285/373 X |
| 4,282,743 | 8/1981 | Pickett ................................... 73/46 |
| 4,374,596 | 2/1983 | Schlemmer et al. ................ 285/305 |
| 4,429,907 | 2/1984 | Timmons ............................ 285/373 |
| 4,466,273 | 8/1984 | Pillette ................................... 73/46 |
| 4,568,925 | 2/1986 | Butts .................................... 340/605 |
| 4,667,505 | 10/1985 | Sharp ............................. 265/373 X |
| 4,696,496 | 9/1987 | de Guelis et al. ............ 265/133.1 X |

FOREIGN PATENT DOCUMENTS 2023296 12/1979 United Kingdom .

Primary Examiner—Dave W. Arola
Attorney, Agent, or Firm—Charles R. Wilson

[57] ABSTRACT

Split fittings for use in the installation of a semi-rigid secondary pipe over a primary pipe comprise a pair of housing halves which, when mated, form a housing enclosure, sealing means and clamping means capable of holding the secondary pipe and housing halves as a sealed enclosure. A method of fitting a rigid pipeline system with secondary containment system with a secondary semi-rigid pipe uses the split fittings.

34 Claims, 6 Drawing Sheets

SPLIT FITTINGS USEFUL IN FORMING A SECONDARY SEMI-RIGID PIPELINE OVER PRIMARY PIPELINES

BACKGROUND OF INVENTION

One specific area where pipelines are used extensively is in the transporting of liquid of bulk storage tanks. Many types of liquids are stored in bulk, both above ground and underground. A special problem exists with the pipelines used in connection with under ground storage tanks. Since pipelines do not last forever due to normal deterioration or damaging external forces. They are always susceptible to leakage. If the liquid being conveyed is a danger to the environment or the health when not controlled, substantial damage can occur before the leak is even detected. For example, storage tanks and its piping are used extensively for storing and dispensing liquid gasoline at retail gasoline stations. Necessarily, these stations are in populated areas and therefore there is always a danger associated with leaks from the tanks or pipelines associated therewith. Any leaks which develop are normally very slow initially. This means that the leak is difficult to detect until a substantial amount of gasoline has leaked. By that time environmental damage and possible health problems have occurred.

The time and expense needed to clean up a gasoline spill can be enormous. The ground surrounding the pipeline would have to be decontaminated, a procedure which could be extensive in case of a slow leak which is not detected early or a sudden large leak. In addition to the expense of the above clean-up, there is a loss of profits due to the down-time involved not only with the damaged pipeline, but also possibly with the whole gasoline station. The health hazards associated with a gasoline spill can also be enormous in case of an accidental fire or drinking water contamination.

Underground pipelines are particularly troublesome in those areas that are prone to earthquakes. Typical pipelines are constructed of metal or rigid plastic. Any earthquake is likely to cause a crack in the pipeline with a consequent leak. If the leak is slow, the same problems as above discussed exists. If the leak is fast, the problem is readily detected, but only after the ground has been contaminated.

The problems associated with the present pipelines are well known. One attempt to solve the known problems has been the use of double walled systems. In this type of system the rigid pipeline is surrounded by a rigid shell which acts as a containment vessel if the pipeline develops a leak. Installation of a rigid secondary containment pipe over a rigid pipeline which is to be part of a gasoline storage tank pipeline system is best accomplished when the storage tanks and pipeline system is first installed. Retrofitting an existing rigid pipeline system with a rigid shell is more difficult. This is because a typical pipeline system is comprised of several bends of greater than 20 degrees and most often 90 degrees and various points where three or even four pipelines meet to form a junction. The problem of how to readily enclose a pipeline junction is virtually insurmountable.

There has now been discovered split fittings useful in a jacketed liquid pipeline system which solves many of the problems inherent with the existing systems. The jacketed system of this invention is economical and readily fitted over existing pipeline systems having a series of bends and/or junctions.

SUMMARY OF THE INVENTION

Split fittings for joining sections of a semi-rigid secondary piping are comprised of two half sections which when joined together form a fitting. Attachment means are used for attaching a secondary piping to the fittings so as to result in a liquid tight fitting. The split fittings are used in assembling a secondary pipeline system having bends and/or pipeline junctions.

DETAILED DESCRIPTION OF THE INVENTION

While the description which follows describes the invention in terms of its use with underground storage tanks, it should be understood the invention has applicability for other uses as well. For example, pipelines associated with above ground storage tanks or connecting pipeline systems can utilize the present invention.

Figure 1:
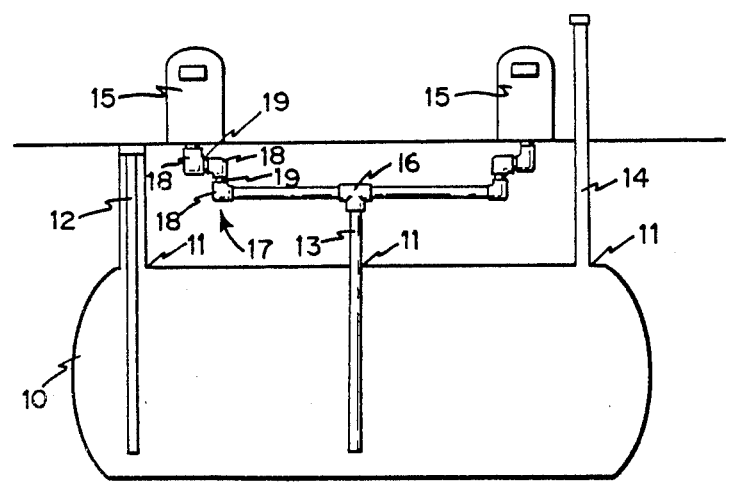
FIG. 1 is a schematic of a liquid storage tank's system wherein the improved pipeline system of this invention could be used.

The fittings illustrated in FIGS. 2-12 are useful in conjunction with existing underground storage tanks and pipeline systems such as illustrated in FIG. 1.

FIG. 1 illustrates a typical storage tank and pipeline system used in gasoline service stations. Storage tank 10, ranging in capacity from 1,000 gallons to 40,000 gallons, is made of metal or a fiberglass reinforced resinous material. Openings 11 allow passage of fill pipe 12, dispensing line 13 and vent pipe 14. Two gasoline dispensers 15 are shown; however, additional gasoline dispensers could dispense gasoline from the storage tank 10 merely by adding additional pipelines appropriately connected into dispensing line 13. Generally, dispensing line 13 enters the storage tank at one location and is then branched as a junction 16 to feed the individual gasoline dispensers. Swing joint 17 comprised of elbow 18, straight pipeline section 19, and elbow 18 is used for connecting the dispensing line to the gasoline dispenser. The particular construction of the swing joint 17 is a safety feature which permits a certain degree of pipe movement without a consequent rupture or leak. While not shown, pumps are positioned within the storage tank, dispensing line or gasoline dispenser for pumping gasoline to the dispenser. All the 2 aforedescribed pipes and lines are securely attached to the storage tank 10 by known means.

The present invention relates to (1) split fittings capable of fitting over a portion of a primary pipeline system and capable of having secured thereto a secondary semi-rigid pipeline, (2) a secondary containment pipeline system comprising primary pipeline encased by a secondary semi-rigid pipeline with the aid of split fittings and (3) a method of retrofitting a existing primary pipeline with a secondary semi-rigid pipeline using the split fittings. The present invention has particular use in a pipeline system associated with underground storage tanks as illustrated in FIG. 1.

Figure 2:
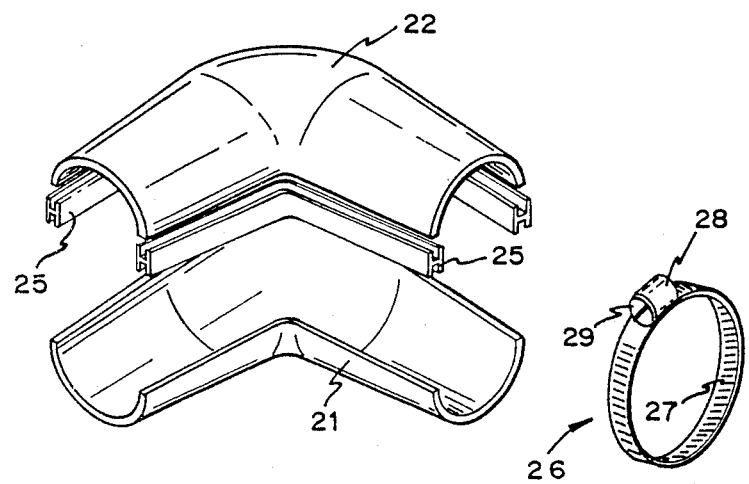
FIG. 2 is an exploded view in perspective of an elbow split fitting useful in installation of a semi-rigid pipeline over an existing rigid pipeline.
Figure 3:
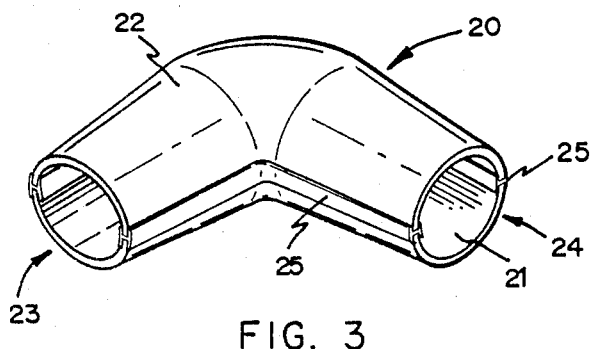
FIG. 3 is perspective view of the assembled elbow split fitting of FIG. 1.

Split fittings of this invention are used for joining together sections of secondary semi-rigid pipeline. The fittings are comprised of a pair of housing halves, sealing means for use in providing a sealed connection when the housing halves are mated and secured together and clamping means for holding said housing halves compressed together and providing means by which a secondary semi-rigid pipeline can be attached to the split fitting forming a housing enclosure. With reference to FIGS. 2 and 3, there is shown a split fitting in the form of a 90 degree elbow. The fitting 20 is comprised of substantially identical housing halves 21 and 22. When mated, the fitting forms an housing enclosure elbow having a hollow cylindrical shaped interior with a 90 degree bend midway between its two extremities 23 and 24. The two extremities 23 and 24 are open and provide ingress and egress for a rigid pipeline or a one-piece 90 degree elbow. Housing halves 21 and 22 are preferably molded from a synthetic polymeric material such as a polyester, polyepoxide, polypropylene, polyethylene, polyurethane, vinylester, polyvinylchloride, or acrylonitrile butadiene styrene or can be cast of metal.

Sealing means 25 is a gasket, preferably made of an elastomeric material such as nitryl rubber, polyurethane, Viton, polyester. Sealing means 25 is in the form of an H having an upper U shaped portion which engages one mated surface of the first housing half and lower inverted U shaped portion which engages one mated surface of the second housing half. A pressure compression seal is provided when the mated housing halves are subsequently clamped together as discussed below.

Sealing means other than the H gasket shown in FIGS. 2 and 3 can be used. For instance, conventional flat gaskets can be dimensioned to fit over the mated surfaces and provide an adequate sealing function. However, such gaskets are cumbersome to install in the fittings of this invention and are, therefore, less preferred. Means other than pressure sealing means can also be used to ensure that the assembled housing enclosure will be liquid tight. Thus, an adhesive can be used for permanently adhering the pair of housing halves together. Several adhesives are commercially available, the particular one used being primarily dependent on the material used in the housings in that the adhesive is compatible to internal or external environment that the fittings are exposed to.

Another essential part of the split fittings of this invention is the clamping means 26. The clamping means must be capable of holding the semi-rigid pipeline to an extremity of the fitting in a liquid tight relationship. This is accomplished by the band clamp compressing the walls of the semi-rigid pipeline to the surface of the split fitting, preferably with an adhesives caulking sealant enhancing the sealing means between the pipeline and fitting.

The secondary pipeline is made of a semi-rigid material and is attached to the split fittings by sliding the secondary pipeline over the housing extremities, sealing the connection with one or more of a gasket, compression seal, adhesive, or caulking, providing a sealing means and holding the housing connection together with special clamping means. As shown in FIGS. 2 and 3, the clamp is a screw-driven banding mechanism conventionally used for hose uses. Other types of clamp mechanisms other than screw-driven may also be utilized in connection with the present invention. Another suitable clamping mechanism is a banding clamp. Such clamps effectively hold the housing halves together while also holding the secondary pipeline over the housing enclosure extremity in a liquid-tight seal as discussed more fully below.

Figure 4:
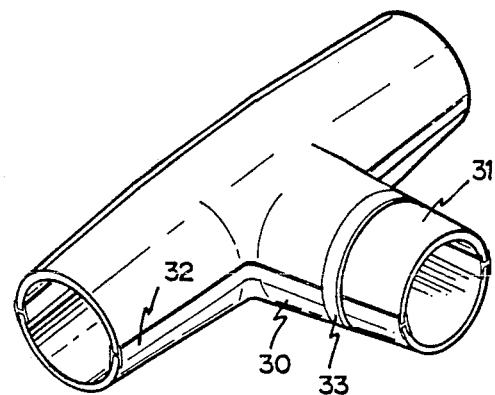
FIG. 4 is a perspective view of a three-way or T split fitting.
Figure 5:
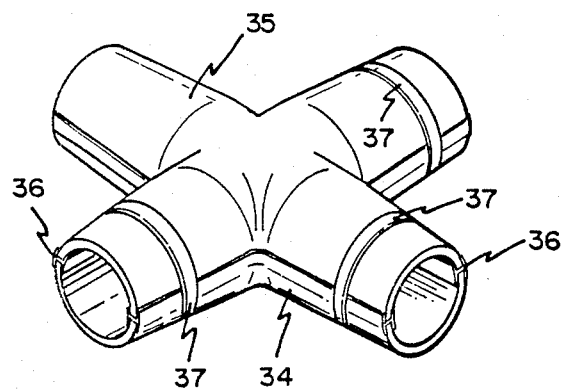
FIG. 5 is a perspective view of a four-way split fitting.
Figure 6:
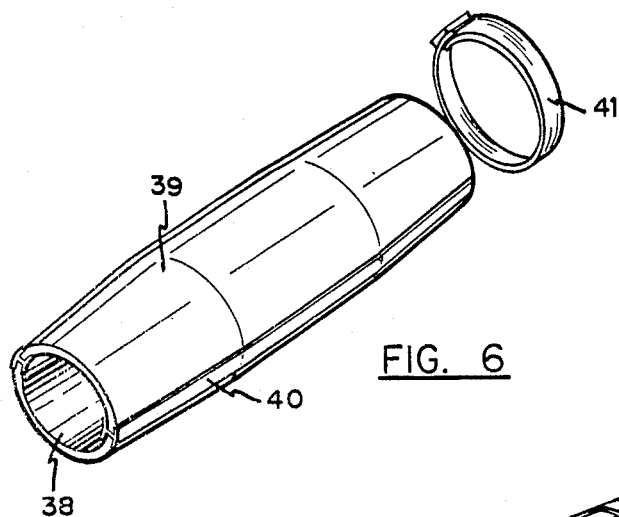
FIG. 6 is a perspective view of a straight split fitting.
Figure 7:
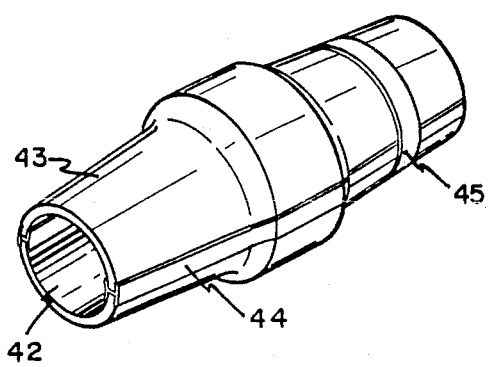
FIG. 7 is a perspective view of a straight split fitting specially constructed to enclose primary pipe unions and couplers.

FIGS. 4-7 show other split fittings forming a part of this invention. Thus, the fitting in FIG. 4 is a three-way or T-fitting comprised of housing halves 30 and 31, sealing means 32 and clamping means 37. The fitting in FIG. 6 is a straight line coupler comprised of housing halves 38 and 39, sealing means 40 and clamping means 41. specially constructed to accommodate a liquid tight fitting when joining two ends of the secondary pipeline ends that are in a straight line to form a housing enclosure. FIG. 7 illustrates a straight line coupler specially constructed to accommodate a union and/or coupler in an underlying primary pipeline. Housing halves 42 and 43 each have enlarged mid-sections which allow them to fit over a corresponding shaped primary pipeline section. All these illustrated fittings utilize the H-type pressure sealing gasket and band-type clamping means shown and discussed above in connection with FIGS. 2 and 3. Other sealing and clamping means are useful as well.

Figure 8:
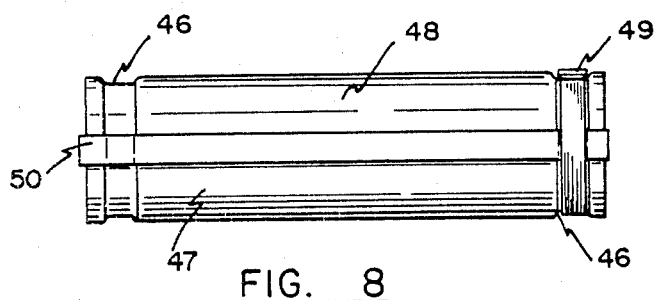
FIG. 8 is a front view of split fittings having recess means for accommodating clamping means.
Figure 9:
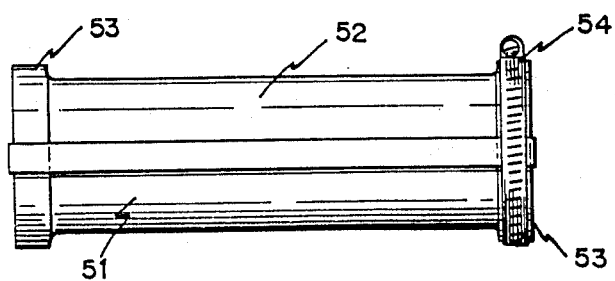
FIG. 9 is a front view of a split fitting having enlarged end portions for accommodating secondary piping sections and clamping means.
Figure 10:
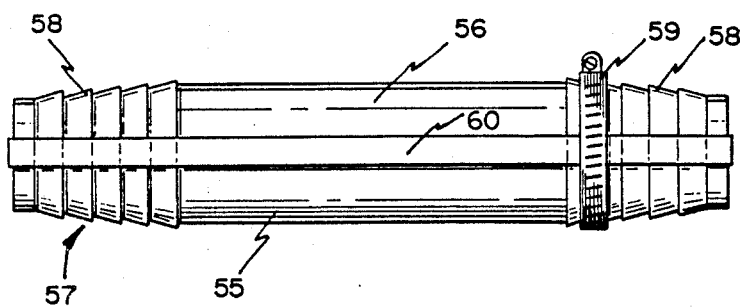
FIG. 10 is a front view of a split fitting having tapered extremities for ease of installation of pipeline sections.

FIGS. 8-10 show housing configurations having special extremity constructions especially adapted to receive secondary pipelines placed outside the housing halves with preferably a caulking and/or adhesive material between the secondary pipeline and housing halves, with clamping means for attaching and sealing the secondary pipeline and split fittings in a liquid-tight manner. While the extremity constructions are shown on straight line couplers, they all can be used on other split fittings and with other sealing means than the illustrated H-type pressure sealing gasket or a combination of sealing means herein described.

In FIG. 8, a recess 46 is provided on each housing half near each extremity thereof. Recess 46 extends around housing halves 47 and 48 such that when the housing halves are mated, the two recesses on each extremity together form a continuous recess completely encircling the fitting. A clamping means 49 of the band-type discussed above can ideally be used to slip over the end of the fitting and into the recess. The sides of the recess 46 provide a retaining means for holding the band and preventing its slippage along the split housing. Sealing means 50 provides a sealing function preferably formed of a adhesive caulking.

FIG. 9 shows a still another split fitting extremity configuration. Each extremity of the housing halves 51 and 52 have a raised portion 53 such that when the halves are mated and assembled together, the outer diameter of the extremity is larger than the interior portion of the assembled fitting. A clamping means 54 can be used on the raised portion or just behind it. The advantage of this configuration is that it results in a very liquid-tight connection with a secondary semi-rigid pipeline is slid over the split fitting.

With reference to FIG. 10, each housing half 55 and 56 is provided with extremities 57 wherein when mated and assembled, the outermost part of the extremity where the openings are found has a smaller diameter than the inner part of the split fitting. The diameter of the extremity gradually gets larger. The advantage of this extremity is that it allows for an easy installation of a semi-rigid pipeline onto the split fitting. Preferably, a series of ridges 58 extend around the tapered portion of the fitting to provide better sealing with the semi-rigid pipeline. Clamping means 59 and sealing means 60 positioned on the tapered portion of the split fitting are capable of providing a liquid tight connection.

Figure 11:
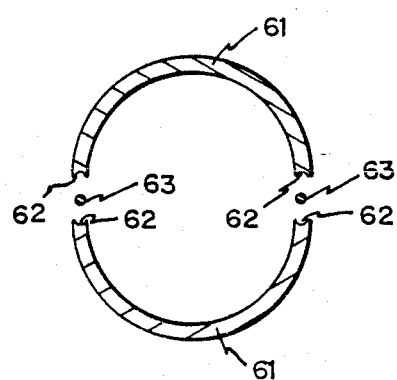
FIG. 11 is an end view of a split fitting configuration adapted for O-ring sealing means.

FIG. 11 illustrates and alternative pressure sealing means. Each housing half 61 at the area where it mates with the second housing half is provided with a groove 62 along its entire length. Pressure sealing means 63 in the form of a cord gasket fits into the grooves 62 so that when the housing halves are assembled and pressure applied by the clamping means, a sealed connection results.

Figure 12:
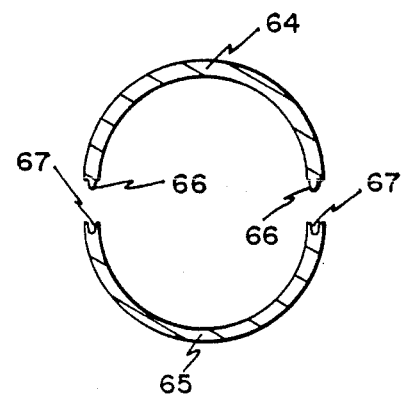
FIG. 12 is an end view of a split fitting having a tongue and groove configuration for holding purposes.

The housing half configuration in FIG. 12 is best used when an adhesive and/or caulking is used to provide a seal between the assembled halves 64 and 65. Thus, a tongue 66 is provided in two mating surfaces while a groove 67 configured to receive the tongue 66 is provided in the other mating surfaces. The tongues and grooves preferably extend the entire length of the mating surfaces. In installation, an adhesive caulking is applied to one mating surface, e.g. on the half provided with a groove and then the other surface with the tongue is inserted into the groove and held until the adhesive has set. The tongue and groove configuration provides a guide means for assembling the housing halves into a unitary fitting. Other shaped configurations such as matched steps and recesses can be provided on the mating surfaces to aid in assembling the housing halves. In a less preferred embodiment, a gasket and clamping means can be used in place of the adhesive caulking. The tongue and groove is a preferred configuration for attaching a secondary semi-rigid pipeline in a liquid tight connection.

Figure 13:
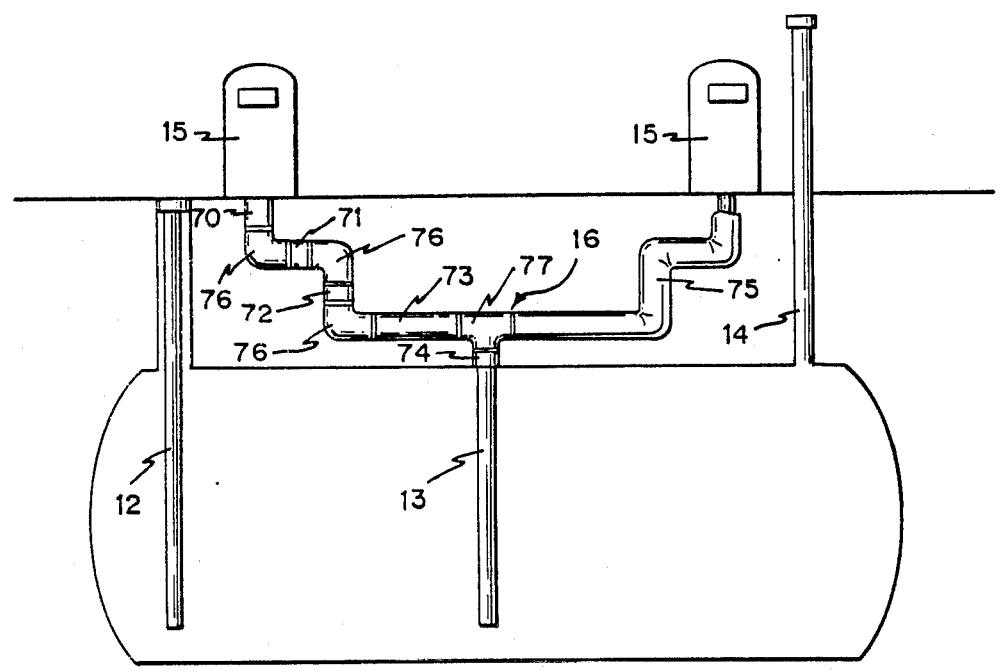
FIG. 13 is a schematic of a pipeline system utilizing the split fittings of this invention.
Figure 14:
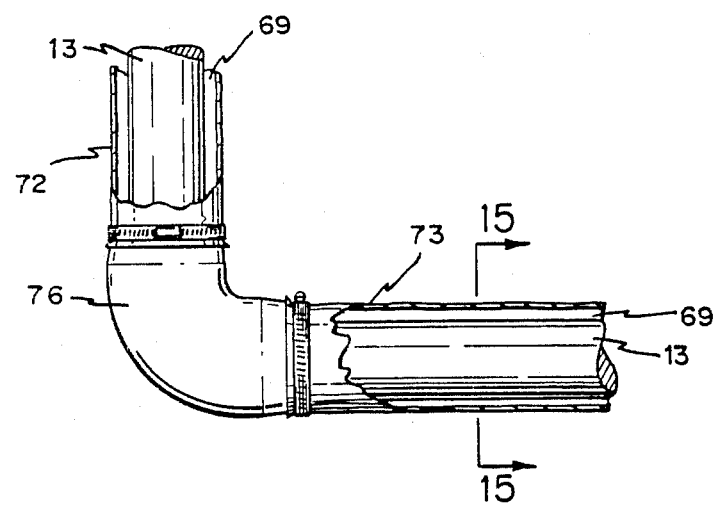
FIG. 14 is a front view partially in section taken along lines 14—14 of FIG. 13.

The split fittings of this invention are especially useful in a pipeline system typically found in use with underground gasoline storage tanks and on which has been installed a semi-rigid pipeline. FIG. 1 illustrates a typical primary pipeline system for conveying gasoline from storage tank 10 to gasoline dispensers 15. FIG. 13 illustrates a storage tank with a secondary pipeline system. FIG. 14, is a partial sectional view taken along lines 14—14 of FIG. 13 illustrates a storage tank with a secondary pipeline system. FIG. 14, is a partial sectional view taken along lines 14—14 of FIG. 13.

Figure 15:
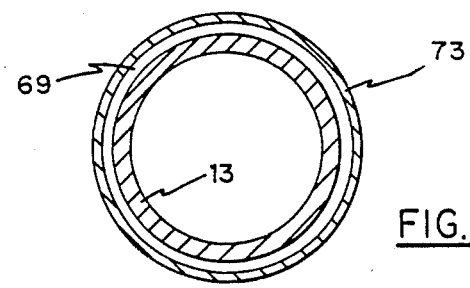
FIG. 15 is an end view taken along lines 15—15 of FIG. 13.

With reference to FIGS. 13, 14, and 15, there is shown a pipeline system using the split fittings of this rigid invention. A series of secondary semi-rigid pipelines completely encase the primary pipeline dispensing line 13. The secondary semi-rigid pipelines are securely attached at opening 11 and the dispensers 15 by suitable means, examples of which include clamp means, ring and band, etc.

The secondary pipeline is constructed of a semi-rigid material of sufficient strength and impermeability to contain the liquid being transported in the primary pipelines in case of a leak. As used herein "semi-rigid" is used in the conventional manner to indicate the secondary pipeline will at least withstand collapsing under its own weight, yet will bend without cracking. The semi-rigid pipeline is preferably made of a synthetic polymeric material such as neoprene, fluoroelastomer, Viton, polyester, polyethylene, high density polyethylene, polypropylene, polyurethane, polyvinylchloride, fabric reinforced of any of the foregoing material as well as materials constructed of two or more of the foregoing materials. e.g. a fluroeastomer coated polyethylene. The elastomeric class of materials have the especially desirable property which allows them to change shape under a force, but to recover their original configuration when the force is removed. The listed materials used in construction of the semi-rigid pipeline are not all inclusive, but only illustrative of some of the materials that can be used. As best seen in FIG. 15, the shape of the secondary pipeline is such that it encases the rigid primary pipeline 13 to form a closed space 69 between it and the pipeline 13.

The nature of the semi-rigid secondary pipeline is such that it is more capable of withstanding many external forces which would cause a rigid pipeline to break. For example, an earthquake will cause movement of the ground surrounding the pipeline, but the semi-rigid secondary pipeline will be capable of "giving." This allows the secondary pipeline to remain intact and also reduces the likelihood of the primary pipeline being broken, or if broken, having its contents contained within the secondary pipeline. Another important advantage inherent of the semi-rigid secondary pipeline of this invention is its ease of installation over existing rigid pipelines. The flexible nature of the semi-rigid secondary pipeline allows it to elongate and/or bend with frost heaves and when loosely fitted, including the split fittings, around the primary rigid pipeline prevents breakage of the primary pipeline. The secondary pipeline is fitted loose enough around the primary pipeline so as not to create inordinate stresses on the rigid primary pipeline from ground movements. The primary pipeline is free floating within the secondary pipeline.

With reference to FIG. 13 six sections of secondary pipeline are used to jacket the dispensing primary pipeline for illustration purposes. Sections 70, 71, and 72 are used to cover one swing joint 17. Section 73 extends from the swing joint 17 to junction 16. Section 74 extends from junction 16 to the point of entry into storage tank 10. The sixth section, i.e. section 75, covers the entire second swing joint and extends to junction 16. Initially swing joint 17 is disconnected at the point where it connects with gasoline dispenser 15. Section 73 is first slid over the primary pipeline to junction 16 before the primary swing three-way joint is assembled. Next, sections 72, 71, and 70 are slid into place as the primary pipeline swing joints are each respectively assembled away from the tank. Split elbow fittings 76 and split three-way fittings 77 are used to connect the respective secondary pipeline sections. As best shown in FIG. 14, the fittings of this invention are installed by placing each housing fitting to an approximately identical or identical shaped fitting and installing a sealing means connecting the sections of 70, 71 and 72 forming the secondary pipeline over the swing joint. Next, the secondary pipeline sections are placed over the extremities of the fittings and the clamping means are tightened.

The installation of section 75 over swing joint shows the advantage derived from more semi-rigid secondary pipeline capabilities. Thus, semi-rigid section 75 can be slipped onto the pipeline system at the point where joint 70 is disconnected from the gasoline dispenser 15 and fed along the pipeline until it reaches junction 16.

Section 74 is installed by disconnecting pipeline 13 at the junction point where it enters the storage tanks 10 and sliding the semi-rigid pipeline onto the pipeline until it reaches junction 16. At this junction a three-way split fitting 77 is used to connect sections 73, 74, and 75 in a manner similar to that described with split fittings 76. Finally, the pipelines are securely attached at the gasoline dispensers and storage tank 10 using suitable attachment means. The resultant secondary pipeline system is liquid tight with the fittings and secondary pipeline providing for secondary containment of any leaked gasoline from rigid pipeline 13.

Figure 16:
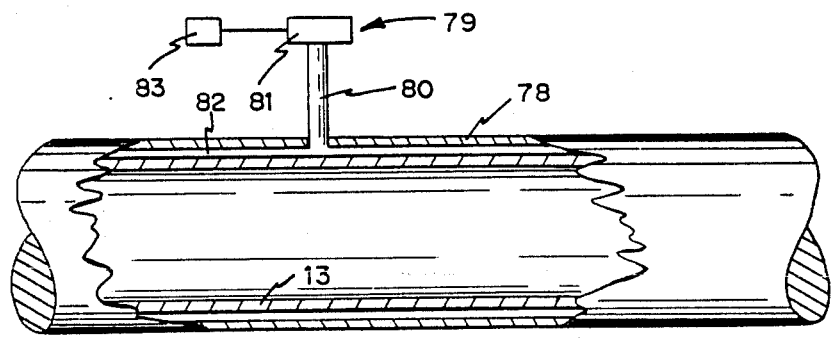
FIG. 16 is a front view of a pipeline section having leak detection capability.
Figure 17:
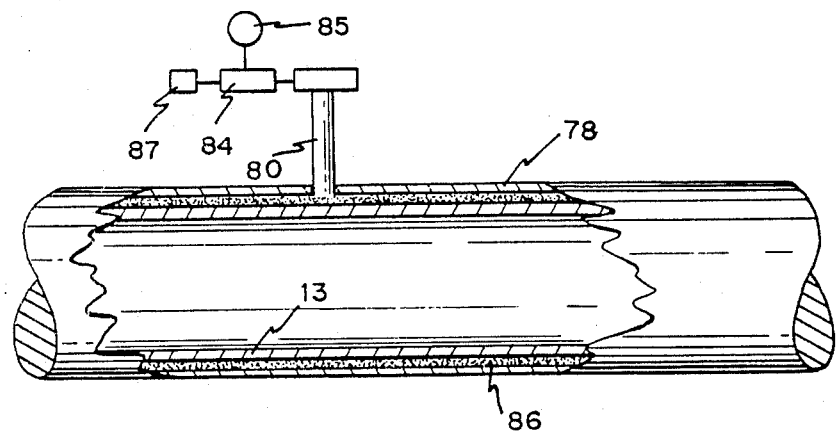
FIG. 17 is a front view of a pipeline section having leak detection capability wherein pressure or vacuum means are provided.

In one embodiment of this invention, leak detection means can be installed to monitor the space between the secondary pipeline and the primary pipeline. FIGS. 16 and 17 illustrate different leak detection means used in this embodiment.

In FIG. 16, the space between the pipeline 13 and the secondary pipeline 78 is closed and in communication with leak detection means 79. The detection means shown in FIG. 15 comprises (1) a standpipe 80, (2) a sight glass 81 associated with the standpipe to allow for easy observation and (3) detecting liquid which completely fills the closed space 82 and extends into the standpipe. Thus, a leak in the pipeline will cause a migration of detecting liquid from the pipeline or, transporting liquid into the closed space 82. Loss of detecting liquid results in a drop of the level of liquid in the standpipe. Migration of liquid into the closed space is also detected by observation. For this purpose, the detecting liquid can be dyed a contrasting color for easier observation. While the sight glass is shown in FIG. 16 as being as ground level it will be appreciated the sight glass can just as easily be at a more convenient location. In colder climates, the detecting liquid must be freezeproof. Thus, the liquid must have a freezing point below that normally experienced or, if water (the preferred detecting liquid) have a sufficient quantity of anti-freeze added to it. Alternatively, the detecting liquid can fill the space between the pipeline and secondary pipeline, but not extend above the freeze line in the standpipe. A sufficient air pressure or vacuum is used in the space above the freeze line. In this case, the means for detecting a leak would be a pressure gauge wherein a pressure change could be observed.

Optionally, alarm means 83 can be associated with the leak detection means to alert an attendant to any leaks. Any liquid level change can be electronically detected to trip the alarm means. Liquid level detectors are commercially available and readily adapted to use herein.

FIG. 17 illustrates an alternative leak detection means wherein a non-atmospheric air pressure (either a positive or negative pressure) is maintained throughout the whole system. Detection means associated with the closed space between the pipeline 13 and secondary pipeline 78 is capable of detecting any change in pressure resulting from a leak in the secondary pipeline or the primary pipeline. The detection means includes means 84 for maintaining the closed space between the pipeline and the jacket under a positive or negative pressure. Conventional air pump or vacuum pump together with an associated pressure regulator can be used. Also included as a part of the detection means is a pressure change sensor 85. As pressure gauge serves this purpose adequately. Gas pervious material 86 is used to maintain a space relationship between the primary pipeline and secondary pipeline. Such means can be a continuous gas pervious material, for example, a stand off mesh including materials of foramens or porous matting construction. Jute, polyurethane foam, fiberglass matting, cotton matting, nylon matting, screens, meshes and asbestos are examples of materials which can be used. An alarm system 87 can optionally be electronically linked with the pressure change sensor to audibly or visually warn of a pre-set significant pressure change.

Another embodiment of the invention utilizes an analyzer capable of detecting the liquid being transported. Thus, the detection means comprises the analyzer which is in communication with the closed space between the primary pipeline and the secondary pipeline. Preferably, a vacuum means for withdrawing gaseous material from the closed space between the secondary pipeline and the primary pipeline is used for the purpose of obtaining a sample to be analyzed. Thus in FIG. 17, element 85 could be a gas analyzer instead of a pressure change sensor as discussed above.

In many pipeline systems, the liquid being transported is under pressure. Any leak in the primary pipeline in such a system would cause a substantial flow of leaked liquid into the closed space between the primary pipeline and the outer secondary pipeline. In such a case, the leak detection systems can comprise a standpipe in communication with the closed space and either a sight glass or a probe capable of detecting selected gases or liquids and/or change in pressure. Thus, a leak in a primary pipeline under pressure would eventually fill the closed space and be observed in the standpipe. Alternatively, a probe which extends through the standpipe and into the closed space will detect the presence of a leaked liquid. Preferably, a gas pervious material of the nature discussed above occupies the closed space so as to maintain a space relationship between the primary pipeline and the secondary pipeline. This space relationship facilitates the migration of leaked fluid thereby assuring it will more readily be in communication with the stand pipe or probe to detect the leak and or failure of the primary or secondary pipeline.

While the invention has been described with respect to certain preferred embodiments, it should be understood that various modifications may be made without departing from the spirit and scope of the invention. Without limitation as to the various modifications that may be made in particular, different shaped and dimensioned housing halves, different shaped and dimensioned extremity openings, and modifications to accommodate accessories such as siphon lines and actuators may be made.

What is claimed is:

1. A split fitting for use in installation of a secondary semi-rigid pipeline over a primary pipeline, comprising:
    (a) a pair of housing halves such that when mated and secured together a complete housing enclosure is formed which has at least two extremities with openings through which the primary pipeline passes, said housing enclosure being capable of enclosing a portion of the primary pipeline and capable of having a secondary semi-rigid pipeline held in place by clamping means to at least one extremity through which the primary pipeline passes;
    (b) sealing means positioned on each mated surface of the housing halves to form a liquid tight seal when said housing haves are secured together; and
    (c) clamping means for holding the secondary semi-rigid pipeline to the housing enclosure in a liquid tight relationship.

2. The split fittings of claim 1 wherein the housing enclosure is a straight line fitting.

3. The split fitting of claim 1 wherein the housing enclosure is an elbow fitting.

4. The split fitting of claim 1 wherein the housing enclosure is a three-way fitting.

5. The split fitting of claim 1 wherein the housing enclosure is a four-way fitting.

6. The split fitting of claim 1 wherein the sealing means is a pressure sealing means.

7. The split fitting of claim 6 wherein the pressure sealing means is a gasket.

8. The split fitting of claim 7 wherein the gasket is an H-type gasket comprising an upper U shaped portion which engages one mated surface of one housing half and a lower, inverted U shaped portion which engages one mated surface of the second housing half.

9. The split fitting of claim 7 wherein the gasket is made of a synthetic polymeric material.

10. The split fitting of claim 1 wherein the surface of each housing half where it mates with the other housing half has a continuous groove in its center portion and said pressure sealing means is a cord gasket which fits into said groove.

11. The split fitting of claim 1 wherein the clamping means is a banding clamp fastener.

12. The split fitting of claim 1 wherein each extremity of the housing enclosure has a continuous recess circumscribing the enclosure so as to form a receiving area for a band to fit and securely hold the secondary pipeline.

13. The split fittings of claim 1 wherein each extremity of the housing enclosure is tapered to readily receive the secondary pipeline.

14. The split fitting of claim 1 wherein a tongue is provided along at least one surface of a housing half and a groove dimensioned to receive the tongue is provided along at least one surface of an second housing half and the sealing means is a adhesive so that the housing halves when mated are held in place by the tongue and groove configuration and adhesive 15. The split fittings of claim 1 wherein the tongue is provided along at least one surface of a housing half and a groove dimensioned to receive the tongue is provided along at least one surface of a second housing half.

16. The split fittings of claim 1 wherein the housing enclosure and secondary pipeline form a liquid tight seal.

17. The split fitting of claim 1 wherein the liquid tight sealing means is formed with a caulking material.

18. The split fitting of claim 17 wherein the caulking material is a polymeric semi-rigid material.

19. The split fitting of claim 17 wherein the caulking is in the form of an adhesive.

20. The split fitting of claim 19 wherein the adhesive is a polymeric material.

21. The split fitting of claim 20 wherein the adhesive is a polyepoxide.

22. The split fitting of claim 1 wherein at least one extremity of the housing enclosure is tapered to readily receive the secondary pipeline.

23. The split fittings of claim 1 wherein the housing halves are rigid.

24. A jacketed pipeline system providing secondary containment, said system having at least one junction comprising:
    (a) a rigid pipeline system for transporting liquid from a storage tank, said pipeline system having at least one junction.
    (b) at least two sections of a semi-rigid jacket which completely encases the rigid pipeline to form a closed space between it and the rigid pipeline; and
    (c) at least one split fitting installed over a junction in the primary pipeline to which is attached the secondary semi-rigid pipeline sections, said split fitting comprised of (i) a pair of housing halves such that when mated and secured together a complete housing enclosure is formed which has at least two extremities with openings through which the primary pipeline passes and which is capable of having the secondary pipeline held in place thereto by clamping means in a liquid tight relationship, (ii) sealing means positioned on each mated surface to form a liquid-tight seal when said housing halves are secured together and (iii) clamping means for holding together the secondary semi-rigid pipeline sections thereto in a liquid-tight relationship.

25. The secondary pipeline system of claim 24 wherein the junction is a 90 degree bend and the split fitting is an elbow fitting.

26. The secondary pipeline system of claim 24 wherein the junction is a three-way junction and the split fitting is a three-way fitting.

27. The secondary pipeline system of claim 24 wherein the junction is a four-way junction and the split fitting is a four-way fitting.

28. The secondary pipeline system of claim 24 wherein the sealing means is a pressure sealing means.

29. The secondary pipeline system of claim 28 wherein the sealing means is an adhesive.

30. The secondary pipeline system of claim 29 wherein the adhesive is a polymeric material.

31. The secondary pipeline system of claim 30 wherein the polymeric material is a polyepoxide.

32. The secondary pipeline system of claim 28 wherein the sealing means is a caulking material.

33. The secondary pipeline system of claim 24 further comprising leak detection means in communication with the closed space to monitor for leakage in the secondary or primary pipeline.

34. The secondary pipeline system of claim 24 wherein the housing halves are rigid.

* * * * *